(12) United States Patent
Lei et al.

(10) Patent No.: US 11,842,077 B2
(45) Date of Patent: Dec. 12, 2023

(54) METHOD, DEVICE, AND COMPUTER PROGRAM PRODUCT FOR TRANSMITTING DATA FOR OBJECT STORAGE

(71) Applicant: EMC IP Holding Company LLC, Hopkinton, MA (US)

(72) Inventors: Lu Lei, Shanghai (CN); Julius Jian Zhu, Shanghai (CN); Sheng Ni, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 17/566,404

(22) Filed: Dec. 30, 2021

(65) Prior Publication Data
US 2023/0100936 A1 Mar. 30, 2023

(30) Foreign Application Priority Data
Sep. 30, 2021 (CN) .......................... 202111164871.3

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01); *G06F 3/0652* (2013.01)
(58) Field of Classification Search
CPC .... G06F 3/0659; G06F 3/0604; G06F 3/0652; G06F 3/06
See application file for complete search history.

(56) References Cited

U.S. PATENT DOCUMENTS

| | | | | |
|---|---|---|---|---|
| 8,909,605 B1* | 12/2014 | Li | ........................ | G06F 11/1464 707/681 |
| 2012/0078978 A1* | 3/2012 | Shoolman | ................ | G06F 16/28 707/E17.055 |
| 2014/0188817 A1* | 7/2014 | Plocher | ................ | G06F 16/1744 707/692 |
| 2014/0281784 A1* | 9/2014 | Verma | .................. | G06F 11/1092 714/752 |
| 2015/0355824 A1* | 12/2015 | Ueno | .................. | G06F 3/04845 715/751 |

(Continued)

OTHER PUBLICATIONS

Snowflake Inc. "Building and Deploying Continuous Data Pipelines With Snowflake & Convoy | Data Cloud Summit" YouTube. Mar. 31, 2021. [https://www.youtube.com/watch?v=0XSToEbm8KM] retrieved Sep. 27, 2022, 3 pages.

(Continued)

*Primary Examiner* — Michelle T Bechtold
(74) *Attorney, Agent, or Firm* — Amin, Turocy & Watson, LLP

(57) ABSTRACT

Transmission of data for object storage, such as stream transmission for object storage, is disclosed. For instance, a group of objects acquired from an object layer is stored in a storage space for storing an object stream and serves as a first part of the object stream; and, in response to that an event related to at least one object in the group of objects occurs at a client terminal, the event-related information is stored in the storage space and is used as a second part of the object stream, the event-related information including at least one of the following: an identifier of the at least one object, a type of the event, and metadata of the event.

20 Claims, 5 Drawing Sheets

(56) References Cited

U.S. PATENT DOCUMENTS

2016/0283584 A1* 9/2016 Dubost ................ G06F 16/217

OTHER PUBLICATIONS

"Continuous Data Pipelines" Snowflake. [https://docs.snowflake.com/en/user-guide/datapipelines.html] retrieved Sep. 27, 2022, 2 pages.
"Join the Data Cloud" Snowflake. [https://www.snowflake.com/en/] retrieved Sep. 27, 2022, 12 pages.
"Table streaming reads and writes" Databricks. Sep. 8, 2022. [https://docs.databricks.com/structured-streaming/delta-lake.html] retrieved Sep. 27, 2022, 11 pages.

* cited by examiner

METHOD, DEVICE, AND COMPUTER PROGRAM PRODUCT FOR TRANSMITTING DATA FOR OBJECT STORAGE

RELATED APPLICATION

The present application claims the benefit of priority to Chinese Patent Application No. 202111164871.3, filed Sep. 30, 2021, which application is hereby incorporated into the present application by reference herein in its entirety.

TECHNICAL FIELD

Embodiments of the present disclosure relate to data transmission, and more specifically, to a method, a device, and a computer program product for transmitting data for object storage.

BACKGROUND

Continuous data pipelines or streaming processing for structured data is becoming more and more popular. Databases are used to store structured data. Changed Data Capture (CDC) protocol can be used to determine and track data changes to tables in databases, so it is feasible to convert stored structured data into streaming data for streaming processing. For unstructured data, in addition to object storage, there is also a streaming storage system (such as Pravega), which already supports streaming computing.

Streaming data is a continuous and huge data stream generated from various data sources at high capacity and high speed. Common examples of streaming data include Internet of things sensor data, server and security logs, real-time advertising, and click stream data from applications and web sites.

SUMMARY

In a first aspect of the present disclosure, a method for transmitting data is provided. The method includes storing a group of objects acquired from an object layer in a storage space for storing an object stream to serve as a first part of the object stream. The method further includes in response to that an event related to at least one object in the group of objects occurs at a client terminal, storing the event-related information in the storage space to serve as a second part of the object stream. The event-related information includes at least one of the following: an identifier of the at least one object, a type of the event, and metadata of the event.

In a second aspect of the present disclosure, an electronic device is provided. The electronic device includes a processor and a memory coupled to the processor, the memory having instructions stored therein which, when executed by the processor, cause the device to execute actions. The actions include storing a group of objects acquired from an object layer in a storage space for storing an object stream to serve as a first part of the object stream. The actions further include, in response to that an event related to at least one object in the group of objects occurs at a client terminal, storing the event-related information in the storage space to serve as a second part of the object stream. The event-related information includes at least one of the following: an identifier of the at least one object, a type of the event, and metadata of the event.

In a third aspect of the present disclosure, a computer program product is provided. The computer program product is tangibly stored on a computer-readable medium and includes machine-executable instructions, wherein the machine-executable instructions, when executed, cause a machine to perform the method according to the first aspect.

The Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, the same reference numerals generally represent the same members. In the accompanying drawings.

DETAILED DESCRIPTION

Figure 1:
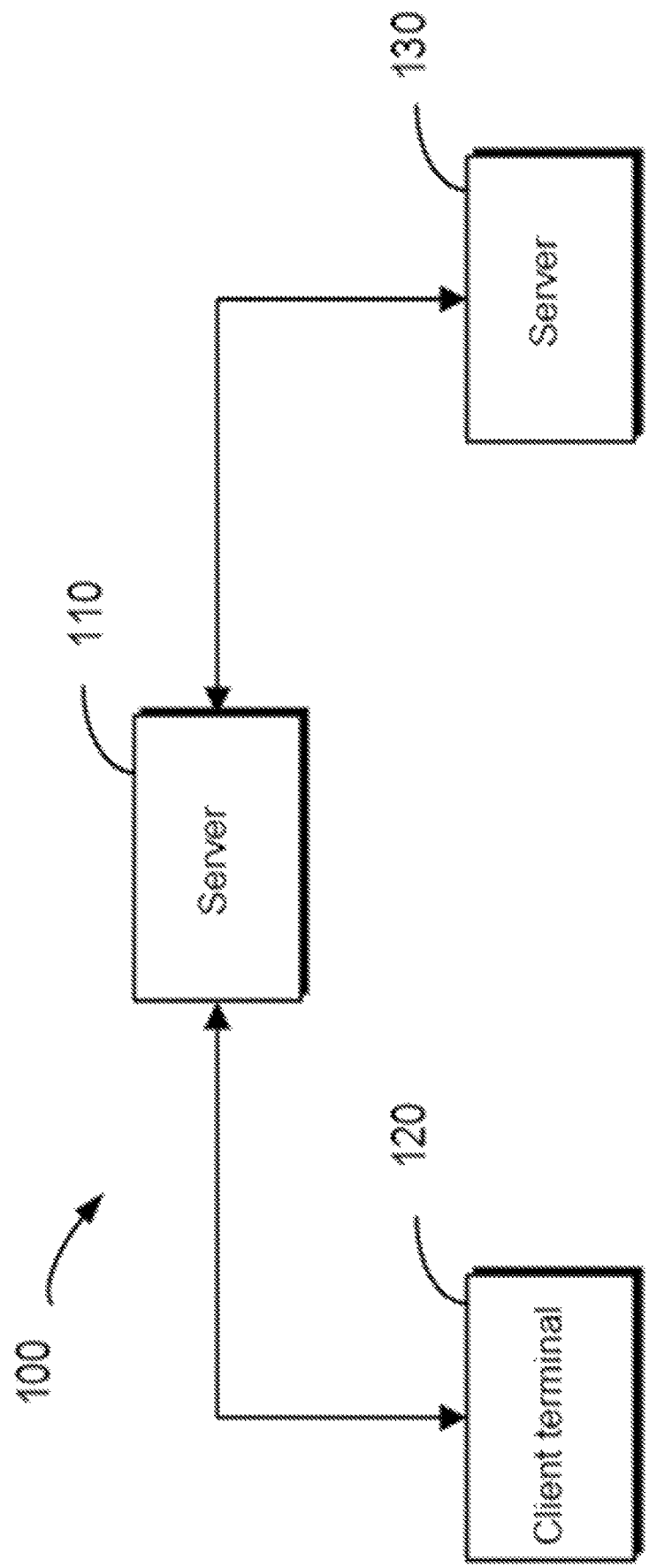
FIG. 1 illustrates a schematic diagram of an example environment in which embodiments of the present disclosure can be implemented.

The principles of the present disclosure will be described below with reference to several example embodiments illustrated in the accompanying drawings. Although preferred embodiments of the present disclosure are illustrated in the accompanying drawings, it should be understood that these embodiments are described merely to enable those skilled in the art to better understand and then implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

In addition to the aforementioned database or streaming storage, object storage is also a commonly used storage method for storing unstructured data. Simple storage service (S3) protocol is a standard protocol for object storage. It is known that there are many object storage systems compatible with the S3 protocol, such as an elastic cloud storage (ECS) system.

However, in many conventional S3 object storages, objects can only be searched for or computed in a batch mode, not in a streaming mode. In a conventional S3 object storage system, a subscriber will only receive notifications from a system after registering with the system, changes of objects in the system before the subscriber's registration and versions before the changes will not be transmitted to the subscriber, and the subscriber can only receive object data of the latest version.

Embodiments of the present disclosure provide a method for transmitting data: acquiring a group of objects from an object layer, and storing the group of objects in a storage space for storing an object stream to serve as a part of the object stream; in response to that an event related to at least one object occurs at a client terminal, storing the event-related information in the storage space to serve as another part of the object stream. The event-related information may include at least one of an identifier of the at least one object, a type of the event, and metadata of the event. According to the embodiments described herein, continuous data pipelines for object storage can be realized by using the object stream.

Basic principles and several example implementations of the present disclosure are illustrated below with reference to FIG. 1 to FIG. 5. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of example environment 100 in which embodiments of the present disclosure may be implemented. As shown in FIG. 1, environment 100 includes server 110, client terminal 120, and server 130 (servers 130 and 110 may be the same server or may be two independent servers). Client terminal 120 uploads object data to server 110, and server 110 converts the object data into streaming data and sends the same to server 130. Server 130 provides streaming data storage and streaming processing. Client terminal 120 may be user equipment or a workstation. Examples of client terminal 120 may include, but are not limited to, a cellular mobile phone, a tablet device, a laptop computer, and the like. Server 110 may be any object storage, such as ECS. Server 130 may be a streaming storage system, such as Pravega.

Server 110 stores the data from client terminal 120, then generates a data stream for the stored data at the same time, and sends the same to server 130 for streaming data storage. Server 110 may also use an object storage architecture compatible with the S3 protocol to store data as objects. Server 130 stores the data as a stream.

The data generated by client terminal 120 is sent to server 110 as objects. After receiving the data sent by client terminal 120, server 110 firstly stores the data and then checks whether there is a registered streaming data need or request. If yes, the stored object data is converted into streaming data and is sent to a registered streaming storage system, such as server 130. This will be described in detail below in combination with FIG. 2 and FIG. 3.

It should be understood that the structure and functions of environment 100 are described for illustrative purposes only and do not imply any limitation to the scope of the present disclosure. For example, the embodiments of the present disclosure may also be applied to an environment different from environment 100. In addition, only two client terminals are shown in FIG. 1, but the number of client terminals is not limited to two, and there may be more or fewer client terminals.

Figure 2:
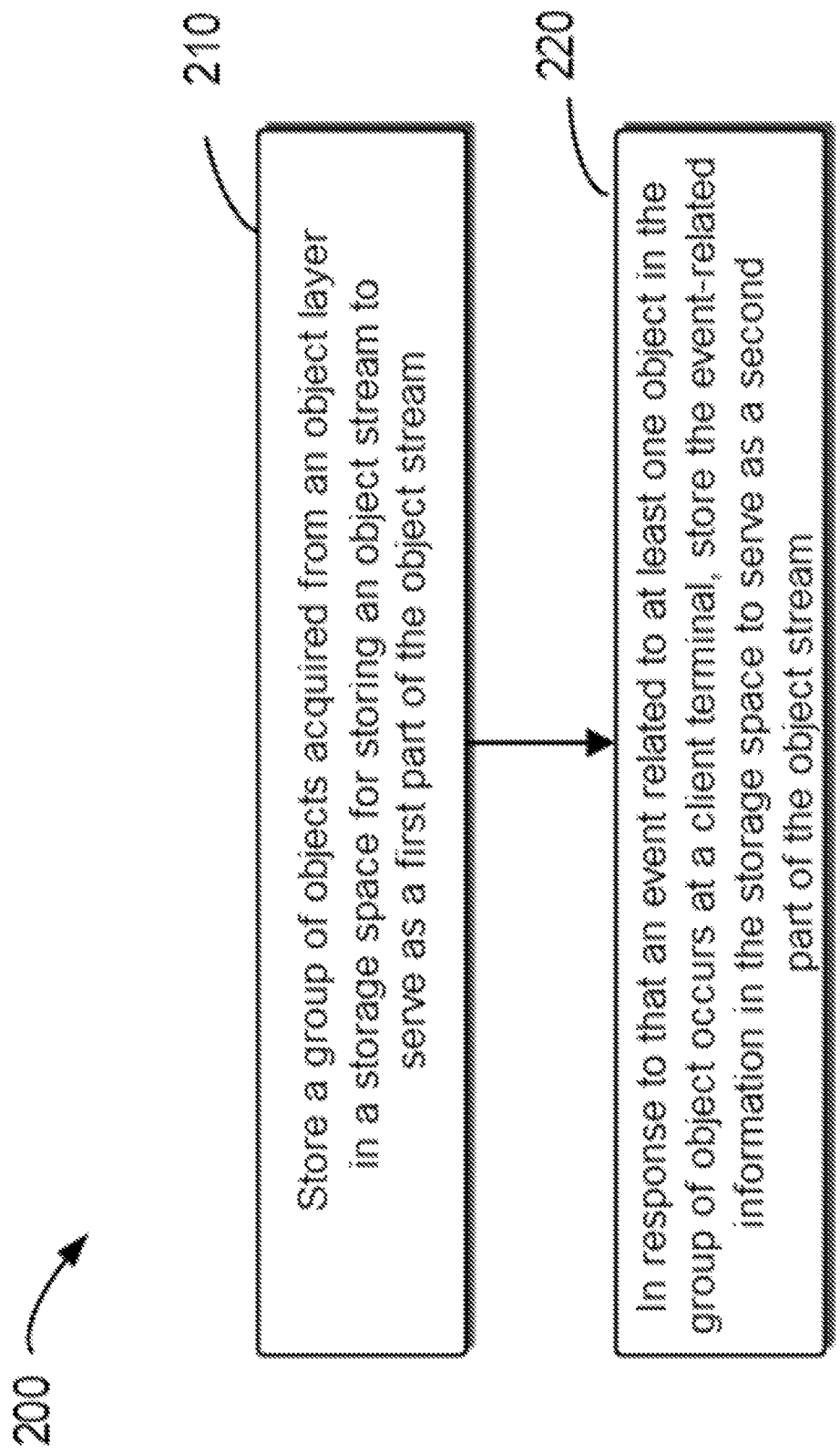
FIG. 2 is a flow chart of an example method for transmitting data according to the embodiments of the present disclosure.

FIG. 2 is a flow chart of example method 200 for transmitting data according to the embodiments of the present disclosure. Method 200 may be implemented by, e.g., server 110 as shown in FIG. 1. It should be understood that method 200 may also include additional actions not shown and/or may omit actions shown, and the scope of the present disclosure is not limited in this regard. Method 200 is described in detail below in combination with FIG. 1 and FIG. 3 to be described later.

At block 210, server 110 stores a group of objects acquired from an object layer in a storage space for storing an object stream to serve as a first part of the object stream. As mentioned above, when server 110 detects a registered streaming data need or request, a storage space for storing an object stream will be allocated. The objects from the object layer are then stored in this storage space as a part of the object stream.

Figure 3:
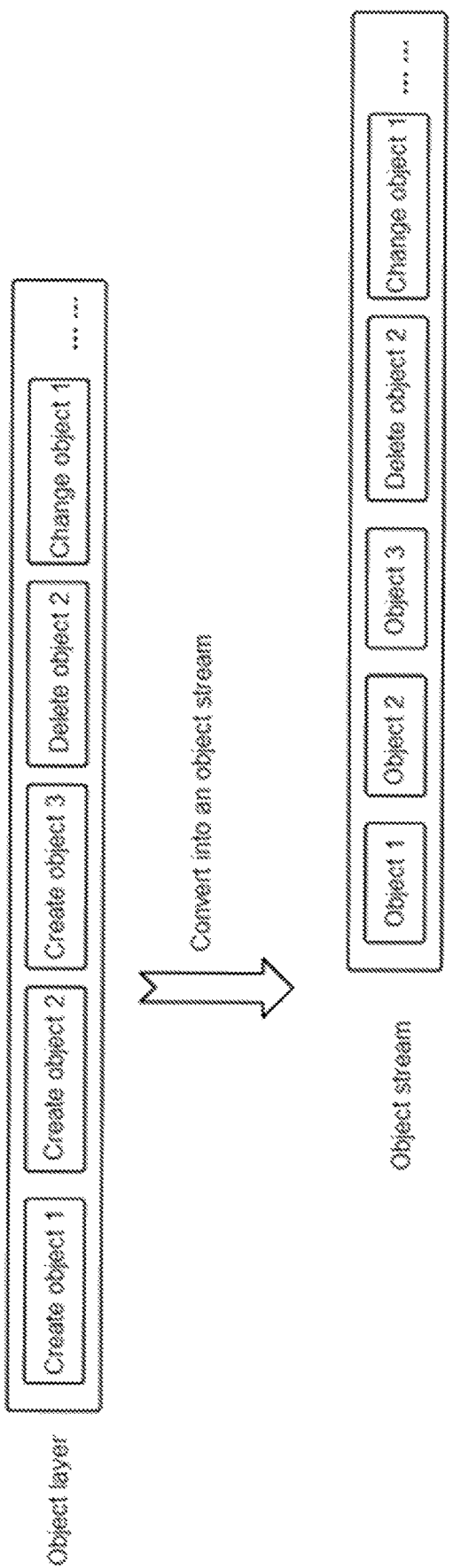
FIG. 3 illustrates a schematic diagram of acquiring objects and event information as an object stream according to some embodiments of the present disclosure.

The example embodiment of the present disclosure is described in detail below with reference to FIG. 3. FIG. 3 illustrates a schematic diagram of acquiring objects from an object layer and event information as an object stream according to some embodiments of the present disclosure. In the embodiment shown in FIG. 3, in the object layer, after object 1 and object 2 are created, server 130 registers a streaming data need or request with server 110. Server 110 starts to convert the objects into an object stream. At this time, object 1 and object 2 are firstly acquired from the object layer and stored in a storage space for storing the object stream.

In some embodiments, client terminal 120 may be a user's mobile phone; the objects may be orders created by the user in an online trading platform application in the mobile phone; and server 130 may be a device used by a merchant of the transaction. For example, the merchant wants to analyze data of the orders generated before and the orders to be generated later, so server 130 chooses to subscribe to an order streaming need or request. At the beginning of the selection of subscription, server 110 acquires all the orders stored in the object layer before, and stores the acquired orders in the storage space for storing the object stream.

Return to FIG. 2, then at block 220, in response to that an event related to at least one object in the above-mentioned group of objects occurs at client terminal 120, the event-related information is stored in the above-mentioned storage space to serve as a second part of the object stream. The event-related information may include: an identifier of the at least one object, a type of the event, and metadata of the event. The metadata of the event indicates the metadata related to the object and generated by the event. The type of the event may indicate that at least one object is changed, which will be described in detail below in conjunction with FIG. 4 and FIG. 3. The type of the event may also indicate that at least one object is deleted.

In the embodiment shown in FIG. 3, previously created object 2 is deleted from the object layer (for example, since the user deletes the order from the mobile phone's trading platform), server 110 will record this deletion event in the storage space as a part of the object stream. Specifically, server 110 will acquire the time when object 2 is deleted from client terminal 120 as the metadata of the event and acquires an identifier of object 2. The metadata and the identifier of object 2 are then stored in the storage space as a part of the object stream.

In this way, the object stream for object storage is created. By use of this object stream, data can be synchronized between two devices in a streaming manner.

In some embodiments, the event that occurs may not be an event related to the above-mentioned group of objects. For example, a new object is created in the object layer. In the embodiment shown in FIG. 3, after server 110 starts to create the object stream, new object 3 is created in the object layer (for example, since the user places a new order in the mobile phone's trading platform application). Correspondingly, server 110 will acquire newly created object 3 and save the same in the storage space as a part of the object stream. Moreover, server 110 will store an identifier of object 3 and a type of the event (indicating that a new object is created) in the storage space as a part of the information related the creation event. In addition, server 110 acquires metadata, such as the time when object 3 is created and a size of created object 3, from client terminal 120, and takes these metadata as another part of the creation event-related information.

Figure 4:
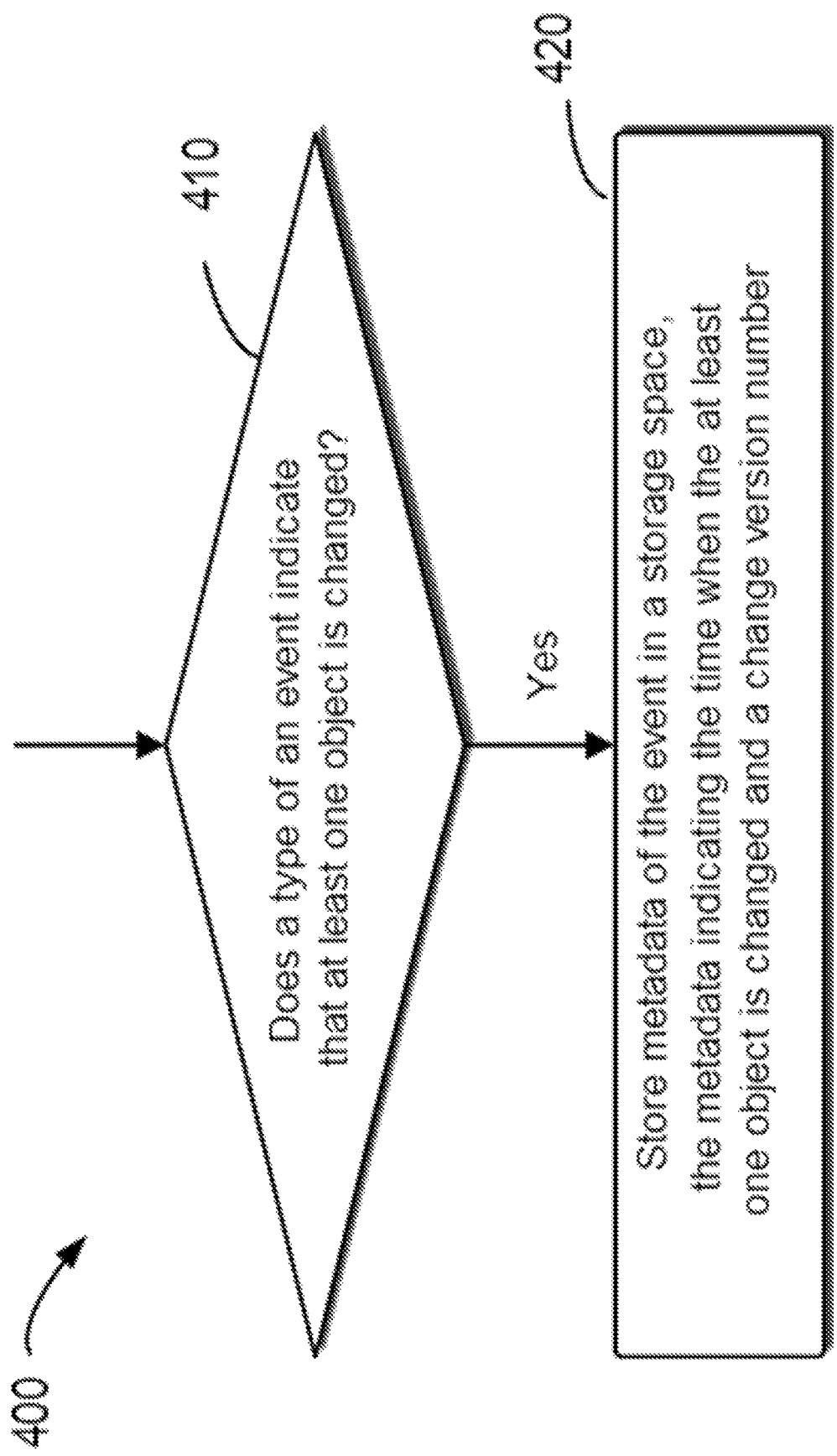
FIG. 4 illustrates a flow chart of an example method for transmitting data according to some embodiments of the present disclosure.

FIG. 4 illustrates a flow chart of example method 400 for transmitting data according to some embodiments of the present disclosure. Method 400 may be regarded as an example implementation of block 220 in method 200. It should be understood that method 400 may also include additional actions not shown and/or may omit actions shown, and the scope of the present disclosure is not limited in this regard. Method 400 is described in detail below in combination with FIG. 1 and FIG. 3.

At block 410, if the type of the event indicates that at least one object is changed, then at block 420, the metadata of the event is stored in the storage space, the metadata indicating the time when the at least one object is changed and a change version number.

For example, in the embodiment shown in FIG. 3, object 1 is changed on client terminal 120. For example, the user changes the number of commodities in an order from 100 to 50 on the mobile phone's trading platform. Then, changed object 1 will be stored in the object layer. At the same time, since server 130 has registered a streaming data need or request for client terminal 120 with server 110 (that is, server 110 has allocated a storage space for storing the object stream for client terminal 120), the change event will be recorded in the object stream. Specifically, when object 1 is changed, server 110 acquires the time when object 1 is changed from client terminal 120 as the metadata of the event and stores the same in the storage space. Server 110 will also store the change version number. A default value of the change version number can be 0. When the object is changed, the change version number can be progressively increased by 1 from the current value. As the number of changes to the object increases, the change version number progressively increases. Of course, server 110 will also store an identifier of object 1 in the storage space.

In this way, all events that occur after server 130 registers the streaming data need or request for client terminal 120 with server 110 can be reflected in the object stream. Even if an error occurs at client terminal 120, resulting in an error in records in the object layer, such object stream can be used to reproduce an operation history of client terminal 120.

In some embodiments, server 110 may also store specific content of the event in the storage space as a part of the object stream. The specific content takes a data payload in an object request as a value. For example, in the above embodiment where object 1 is changed, changed object 1 is created with 2 KB client terminal data, and then the entire 2 KB client terminal data will be stored in the storage space as the value of the specific content.

If the size of an object is extremely large, the above method is obviously inappropriate since it will cause the object stream to become extremely large, which is not conducive to transmission. Therefore, in some embodiments, the specific content of an event may also be stored at other locations. Then, server 110 stores an index indicating a storage position of the specific content in the storage space to be constructed into the object stream as the information about the event.

In the embodiments of the present disclosure, server 110 may transmit the object stream to server 130 in response to a request of server 130.

In some embodiments, server 110 may also determine a time duration between current time and the last time when server 130 requests client terminal 120-2 to transmit the object stream. If the time duration exceeds a threshold duration, server 110 deletes the object stream from the storage space. The threshold duration can be 1 day, 2 days, 3 days, one week, etc. The threshold duration can be set by users, or can be changed by users according to their own needs or requests.

In this way, the waste of server resources can be reduced, and the storage cost can be reduced.

In some embodiments, server 110 may also stop, on the basis of the size of the object stream exceeding a threshold size, storing newly created objects or event-related information in the storage space.

The embodiments of the present disclosure have been described above with reference to the accompanying drawings. It should be understood that the event-related information explained above is only an example. On the basis of the present disclosure, those skilled in the art can think of constructing other event-related information as a part of the object stream.

Figure 5:
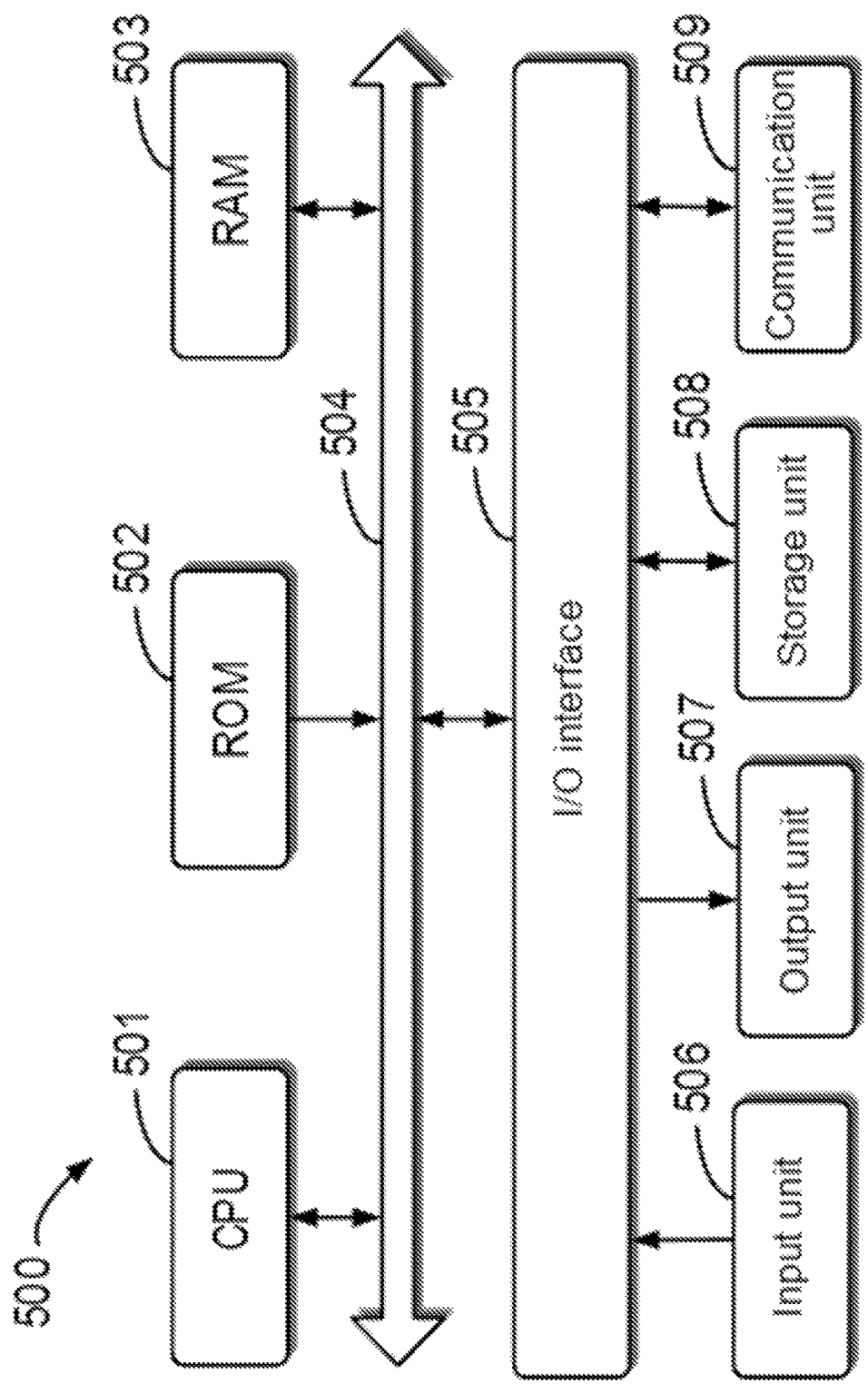
FIG. 5 illustrates a block diagram of an example device that can be used to implement embodiments of the present disclosure.

FIG. 5 illustrates a schematic block diagram of example device 500 that can be used to implement embodiments of the present disclosure. For example, server 110 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by processing unit 501. For example, in some embodiments, method 200 may be implemented as a computer software program that is tangibly included in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

What is claimed is:

1. A method, comprising:
   storing, by a system comprising a processor, a group of objects acquired from an object layer in a storage space for storage of an object stream to serve as a first part of the object stream;
   in response to determining that an event related to at least one object in the group of objects has occurred at a client terminal, storing event-related information in the storage space to serve as a second part of the object stream, the event-related information comprising at least one of: an identifier of the at least one object, a type of the event, or metadata of the event; and
   in response to determining that a size of the object stream exceeds a threshold size, stopping storage of the event-related information in the storage space.

2. The method according to claim 1, further comprising:
   in response to determining that a new object has been created in the object layer, storing the new object acquired from the object layer in the storage space to serve as a third part of the object stream; and
   in further response to the determining that the size of the object stream exceeds the threshold size, stopping storage of the new object in the storage space.

3. The method according to claim 1, wherein the event-related information further comprises at least one of:
   specific content of the event, or
   an index indicating a storage position of the specific content of the event.

4. The method according to claim 1, wherein storing the event-related information in the storage space comprises:
   in response to determining that the type of the event indicates that the at least one object has been deleted, storing the metadata of the event in the storage space, the metadata indicating a time when the at least one object was deleted.

5. The method according to claim 1, wherein storing the event-related information in the storage space comprises:
   in response to determining that the type of the event indicates that the at least one object has changed, storing the metadata of the event in the storage space, the metadata indicating a time when the at least one object changed and a change version number, wherein the change version number progressively increases with a number of changes of the at least one object.

6. The method according to claim 1, further comprising:
   determining a time duration between a current time and a last time when the object stream was requested to be transmitted; and
   in response to determining that the time duration exceeds a threshold duration, deleting the object stream from the storage space.

7. A device, comprising:
   a processor; and
   a memory coupled to the processor, the memory having instructions stored therein, wherein the instructions, when executed by the processor, cause the device to execute operations comprising:
   storing a group of objects acquired from an object layer in a storage space for storage of an object stream to serve as a first part of the object stream;
   in response to determining that an event related to at least one object in the group of objects occurs at a client terminal, storing event-related information in the storage space to serve as a second part of the object stream, the event-related information comprising at least some information from a group of information, the group of information comprising an identifier of the at least one object, a type of the event, and metadata of the event; and
   in response to determining that a size of the object stream exceeds a threshold size, stopping storage of the event-related information in the storage space.

8. The device according to claim 7, wherein the operations further comprise:
   in response to determining that a new object is created in the object layer, storing the new object acquired from the object layer in the storage space to serve as a third part of the object stream; and
   in further response to the determining that the size of the object stream exceeds the threshold size, stopping storage of the new object in the storage space.

9. The device according to claim 7, wherein the event-related information further comprises:
   specific content of the event, or
   an index indicating a storage position of the specific content of the event.

10. The device according to claim 7, wherein storing the event-related information in the storage space comprises:
    in response to determining that the type of the event indicates that the at least one object is deleted, storing the metadata of the event in the storage space, the metadata indicating a time when the at least one object is deleted.

11. The device according to claim 7, wherein storing the event-related information in the storage space comprises:
    in response to determining that the type of the event indicates that the at least one object is changed, storing the metadata of the event in the storage space, the metadata indicating a time when the at least one object is changed and a change version number, wherein the change version number progressively increases with a number of changes of the at least one object.

12. The device according to claim 7, wherein the operations further comprise:
    determining a time duration between a current time and a last time when the object stream is requested to be transmitted; and
    in response to determining that the time duration exceeds a threshold duration, deleting the object stream from the storage space.

13. A computer program product that is stored on a non-transitory computer-readable medium and comprises machine-executable instructions, wherein the machine-executable instructions, when executed, cause a machine to perform operations comprising:
    storing, by a system comprising a processor, a group of objects acquired from an object layer in a storage space for storage of an object stream to serve as a first part of the object stream;
    in response to determining that an event related to an object in the group of objects has occurred at a client terminal, storing event-related information in the storage space to serve as a second part of the object stream, the event-related information comprising at least one of: an identifier of the object, a type of the event, or metadata of the event; and in response to determining that a size of the object stream exceeds a threshold size, stopping storage of the event-related information in the storage space.

14. The computer program product according to claim 13, wherein the operations further comprise:

in response to determining that a new object has been created in the object layer, storing the new object acquired from the object layer in the storage space to serve as a third part of the object stream; and in further response to the determining that the size of the object stream exceeds the threshold size, stopping storage of the new object in the storage space.

15. The computer program product according to claim 13, wherein the event-related information further comprises specific content of the event.

16. The computer program product according to claim 13, wherein the event-related information further comprises an index representative of a storage position of specific content of the event.

17. The computer program product according to claim 13, wherein storing the event-related information in the storage space comprises:

in response to determining that the type of the event indicates that the object has been deleted, storing the metadata of the event in the storage space, the metadata indicating a time when the object was deleted.

18. The computer program product according to claim 13, wherein storing the event-related information in the storage space comprises:

in response to determining that the type of the event indicates that the object has changed, storing the metadata of the event in the storage space, the metadata representative of a time when the object changed and a change version number, wherein the change version number progressively increases with a number of changes of the object.

19. The computer program product according to claim 13, wherein the operations further comprise:

determining a time duration between a current time and a last time when the object stream was requested to be transmitted.

20. The computer program product according to claim 19, wherein the operations further comprise:

in response to determining that the time duration exceeds a threshold duration, deleting the object stream from the storage space.

\* \* \* \* \*